(12) United States Patent
Schnee et al.

(10) Patent No.: US 12,263,906 B2
(45) Date of Patent: Apr. 1, 2025

(54) METHOD AND DEVICE FOR CLASSIFYING AN ACCIDENT EVENT INVOLVING A TWO-WHEELED VEHICLE

(71) Applicant: Robert Bosch GmbH, Stuttgart (DE)

(72) Inventors: Jan Schnee, Weil Im Schoenbuch (DE); Juergen Stegmaier, Wannweil (DE)

(73) Assignee: ROBERT BOSCH GMBH, Stuttgart (DE)

( * ) Notice: Subject to any disclaimer, the term of this patent is extended or adjusted under 35 U.S.C. 154(b) by 274 days.

(21) Appl. No.: 17/782,894

(22) PCT Filed: Jan. 19, 2021

(86) PCT No.: PCT/EP2021/051031
§ 371 (c)(1),
(2) Date: Jun. 6, 2022

(87) PCT Pub. No.: WO2021/151724
PCT Pub. Date: Aug. 5, 2021

(65) Prior Publication Data
US 2023/0026459 A1  Jan. 26, 2023

(30) Foreign Application Priority Data

Jan. 31, 2020  (DE) .................... 10 2020 201 223.7

(51) Int. Cl.
*B62J 27/00* (2020.01)
*B62J 3/00* (2020.01)
(Continued)

(52) U.S. Cl.
CPC ............... *B62J 27/00* (2013.01); *B62J 6/26* (2020.02); *B62J 50/21* (2020.02); *H04W 4/80* (2018.02); *B62J 3/00* (2013.01); *B62M 6/40* (2013.01)

(58) Field of Classification Search
CPC ........... B62J 45/414; B62J 27/00; H04W 4/80
(Continued)

(56) References Cited

U.S. PATENT DOCUMENTS

2021/0061209 A1*  3/2021  Park ..................... G08B 25/016

FOREIGN PATENT DOCUMENTS

DE       102009036828 A1 *  2/2011 ............. A42B 3/046
DE       102010027969 A1    10/2011
(Continued)

OTHER PUBLICATIONS

International Search Report for PCT/EP2021/051031, Issued Mar. 26, 2021.

*Primary Examiner* — Todd Melton
*Assistant Examiner* — Vincent Feng
(74) *Attorney, Agent, or Firm* — NORTON ROSE FULBRIGHT US LLP; Gerard A. Messina

(57) ABSTRACT

A method for classifying an accident event of a two-wheeled vehicle, in particular a bicycle. The method is able to run as an algorithm on a device having an evaluation unit in order to indicate to the driver of the two-wheeled vehicle or to a third party a collision or fall of the two-wheeled vehicle with the aid of correspondingly generated and/or transmitted information. The device may be used for a two-wheeled vehicle such as a bicycle and in particular for an electric bicycle. The use is naturally also possible for a motorcycle or some other single-track vehicle.

15 Claims, 5 Drawing Sheets

(51) Int. Cl.
*B62J 6/26* (2020.01)
*B62J 50/21* (2020.01)
*B62M 6/40* (2010.01)
*H04W 4/80* (2018.01)

(58) Field of Classification Search
USPC .......................................................... 701/29.2
See application file for complete search history.

(56) References Cited

FOREIGN PATENT DOCUMENTS

| EP | 2096004 A2 | 9/2009 |
| EP | 2908299 A1 | 8/2015 |
| JP | 2010055261 A | 3/2010 |

\* cited by examiner

METHOD AND DEVICE FOR CLASSIFYING AN ACCIDENT EVENT INVOLVING A TWO-WHEELED VEHICLE

FIELD

The present invention relates to a method and a device for classifying an accident situation involving a two-wheeled vehicle, in particular an accident involving an electric bicycle.

BACKGROUND INFORMATION

With the aid of a number of sensors that are attached to a two-wheeled vehicle, e.g., a bicycle and especially an electric bicycle, both the operation of the two-wheeled vehicle and the driving state are able to be monitored. For example, speed sensors can acquire the wheel speed and, derived therefrom, the speed of the two-wheeled vehicle. In addition, tilt sensors or also acceleration or rotation-rate sensors are able to acquire the tilt or inclination on the road, and sensors on the pedal crank are capable of acquiring the driving activity.

Critical situations or even accidents are able to be detected by an evaluation of these acquired sensor variables, for example by monitoring the time characteristic of these sensor variables. Such detected critical situations or also accidents may be used to automatically summon assistance or at least to forward information to third parties.

An object of the present invention is to classify an accident so that, for instance, an accident event in the form of a critical situation is able to be distinguished from the bicycle falling without a direct collision.

SUMMARY

The present invention relates to a method for classifying an accident event of a two-wheeled vehicle, in particular a bicycle. The method according to the present invention may run as an algorithm on a device having an evaluation unit in order to inform the driver of the two-wheeled vehicle or a third party of a collision or a rollover of the two-wheeled vehicle with the aid of correspondingly generated and/or emitted information. The device may be used for a two-wheeled vehicle such as a bicycle or especially for an electric bicycle. However, a motorcycle or some other single-track vehicle is naturally also able to use the device.

In accordance with an example embodiment of the present invention, to carry out the classification of the accident event, at least a movement variable, a collision variable, an orientation variable, and an impact variable are acquired or generated from the acquired sensor variables in order to derive or generate at least one classification variable from an overall view of the individual variables. The classification variable is able be generated both in digital form and in the form of a numerical value, a database or a vector.

The consideration of multiple variables, which describe both the accident situation and the driving parameters of the two-wheeled vehicle, makes it possible to plausibilize and thus improve the detection of an accident. Performing a classification as a function of multiple variables or values not only allows for the mere detection of an accident but also for the detection of the severity of the accident. By also identifying the severity in addition to the accident detection, summoned assistance or rescue personnel may already obtain advance notification about possible necessary assistance. In addition, the classification also makes it possible to detect accident situations without a driver involvement so that the driver, for instance, is able to be informed of a fall of the parked bicycle having when the driver is not present in the vicinity of the two-wheeled vehicle.

Different scenarios and accident situations are able to be distinguished from one another by the classification and the related generation of classification variables. For example, if it is detected that an accident has occurred that most likely has resulted in a personal injury, e.g., of the driver of the two-wheeled vehicle, then the method according to the present invention may generate an emergency alarm and output it to an appropriate instance. Moreover, because of the acquired sensor variables for deriving the classification, a severe accident involving considerable personal injury is able to be distinguished from a minor accident involving only minor personal injury. This additional information, which can be derived from the generated classification variable according to the present invention, gives the summoned emergency team advance information about the necessary assistance measures.

In a further example embodiment of the present invention, it may be provided that when a corresponding accident situation or classification variable is detected, the present method acts directly on components of the two-wheeled vehicle in an effort to prevent further harm, in particular to the driver or other persons. For example, in an accident it is possible that an electrical or motor-driven drive of the two-wheeled vehicle is shut down. Optionally or additionally, a further component such as an acoustic and/or optical warning device is able to be activated.

As a movement variable, the method is able to acquire any sensor variable that characterizes the movement of the two-wheeled vehicle. In this context, it is particularly provided to acquire the movement components in the longitudinal or driving direction or in the direction transverse to the longitudinal/driving direction in order to thereby characterize the movement of the two-wheeled vehicle in the movement plane, that is, on the road. Typical sensor variables that represent the movement in at least one direction in space are velocity variables and/or acceleration variables. In this context, depending on the movement direction, both the velocity and the acceleration may be split up and separated into a component in the longitudinal direction of the two-wheeled vehicle or into a component in a transverse direction of the two-wheeled vehicle, perpendicular to the longitudinal direction. Such a separation makes it possible to clearly distinguish the movements in the movement plane so that a classification into a frontal rear-end collision and a lateral rollover is possible. It may optionally also be provided to acquire a movement component in the direction of the vertical axis in each case. Since the two-wheeled vehicle typically moves along its longitudinal direction or also longitudinal axis, this longitudinal direction usually corresponds to the driving direction of the two-wheeled vehicle. Only during cornering may there be an often temporary difference. However, this difference is also reflected in the additional movement component in the transverse direction or also in the direction of the transverse axis, which means that no separate evaluation is required.

As a collision variable, the method according to the present invention acquires a variable that represents a collision of the two-wheeled bicycle with a further object or a person present especially on the road or in the movement plane of the two-wheeled vehicle. For this purpose, a method (not described in greater detail) is carried out or a device is used which provides the method according to the present invention with information about a collision that has occurred. Optionally, it may also be provided that the method according to the present invention be started only by the generation of collision information. It is also possible that the collision variable is generated by the evaluation of the movement variable and/or the velocity and/or acceleration variables used for this purpose. In this way, a rear-end collision is able to be detected by a change over time in the velocity and/or the acceleration, e.g., in the longitudinal direction, if the velocity drops, especially to zero, within a very short time, in particular without a braking intervention being detected.

Another variable that is acquired in the classification represents the orientation variable. This orientation variable may represent both the change in orientation of the two-wheeled vehicle and its current orientation. For instance, it is possible that a current orientation is detected when roll angle $\varphi$ and pitch angle $\theta$ remain unchanged over a pre-defined period of time. With the aid of the angle change detected in the process, it is possible to distinguish whether the two-wheeled vehicle is in an upright position or lies on the road or the ground. Apart from that, however, further orientations are also possible such as in the case of a two-wheeled vehicle that leans against a wall at an angle. Depending on which further acquired variables are available, the classification can thereby be specified by a classification variable that is assigned to a certain situation, in particular an accident situation.

The orientation variable may also be acquired in the form of a dynamic variable by detecting the change in the roll angle and/or pitch angle. In this case, because of the rapidity of the change, a classification may also take place in that certain rapid changes are more likely assigned to an accident rather than a deliberate movement of the two-wheeled vehicle.

In a further refinement of the present invention, it is provided to specify the orientation variable in the form of a tilting variable, with which both the roll angle and the pitch angle are combined in the sense of a common tilting movement.

Based on the acquired rotary movements of the two-wheeled vehicle, it can furthermore be derived whether a rider had been on the bicycle during the accident. This is advantageous if no weight sensor allocated to the saddle is provided for the two-wheeled vehicle. Thus, from the movement characteristic during a lateral rotation about the longitudinal axis, it can be identified whether this movement is strictly monotonic or uniformly steady or whether it exhibits different interruptions. If a two-wheeled vehicle were to roll over without a rider, then a uniform movement or acceleration would be detected, e.g., with the aid of a corresponding rotation-rate signal. However, if the driver is still on the two-wheeled vehicle, the driver would instinctively attempt to slow the fall so that changes in the corresponding velocity, acceleration or rotation-rate components would be identifiable in the movement characteristic. In order to eliminate possibly present sensor noise that could lead to an incorrect result of this evaluation, the sensor signal could be low-pass filtered using a suitable filter.

By acquiring the impact variable, it can be detected whether the two-wheeled vehicle strikes an obstacle such as the ground, the pavement or an object. The corresponding velocity, acceleration or rotation-rate components could be analyzed as well for this purpose. For example, it is possible that the two-wheeled vehicle briefly bounces in the opposite direction after an impact if it strikes the obstacle, e.g., the ground, with sufficient speed. Also possible is that the velocity or acceleration component in the direction of the vertical axis is deliberately utilized to this end.

Additional advantages result from the following description of exemplary embodiments and the figures.

DETAILED DESCRIPTION OF EXAMPLE EMBODIMENTS

A two-wheeled vehicle in the form of a bicycle 10 is used to describe the present invention, but other single-track vehicles such as electric bicycles, motorcycles, e-scooters, motor scooters or also motor vehicles could be developed according to this invention. In this particular case of bicycle 10, a smartphone 20 is provided as a mobile user terminal, which is fixed in place on the handlebar of vehicle 10 and configured to acquire and process sensor variables and sensor data. For instance, smartphone 20 is used as a navigation instrument, as a display of parameters related to driving dynamics, and/or for the control of the drive of vehicle 10. To carry out the method according to the present invention, smartphone 20 uses the sensor variables it receives from the sensors provided in smartphone 20. Alternatively or optionally in addition, smartphone 20 may also utilize sensors that are mounted on bicycle 10. For example, acceleration sensors on one of the wheels and/or the frame and angle sensors and rotation-rate sensors would be possible in this context. As a rule, the bicycle essentially moves forward on roadway 30 in movement plane xy in longitudinal direction x. Through turning and cornering operations, movement plane xy is defined by an additional lateral transverse direction y. A movement in the direction of vertical axis z, for example, takes place in the framework of uphill and downhill driving. Further movements that may have an effect in the direction of the vertical axis are generated by rotations in the direction of the x-axis or by uneven pavements. All of these movements in the direction of the z-axis are able to be distinguished from one another by characteristic orders of magnitude of the rate of change, i.e., dz/d. For instance, uphill or downhill driving is connected with a longer time constant than the lateral rollover of the bicycle essentially along the x-axis. Road irregularities, on the other hand, are characterized by very small movements in the z-direction within a short period of time.

The sensors inside smartphone 20 are aligned with their own coordinate system. The mounting of the smartphone on the handlebar thus requires a calibration for the alignment with the coordinate system specified by the movement. This makes it possible to utilize the spatially resolved sensor variables of the rotation-rate sensor or the acceleration sensor in the smartphone for detecting this defined coordinate system during a normal driving operation. One possibility for carrying out this calibration for aligning the sensor variables with the movement plane xy of the bicycle is an Euler angle estimation method, for example.

Figure 1:
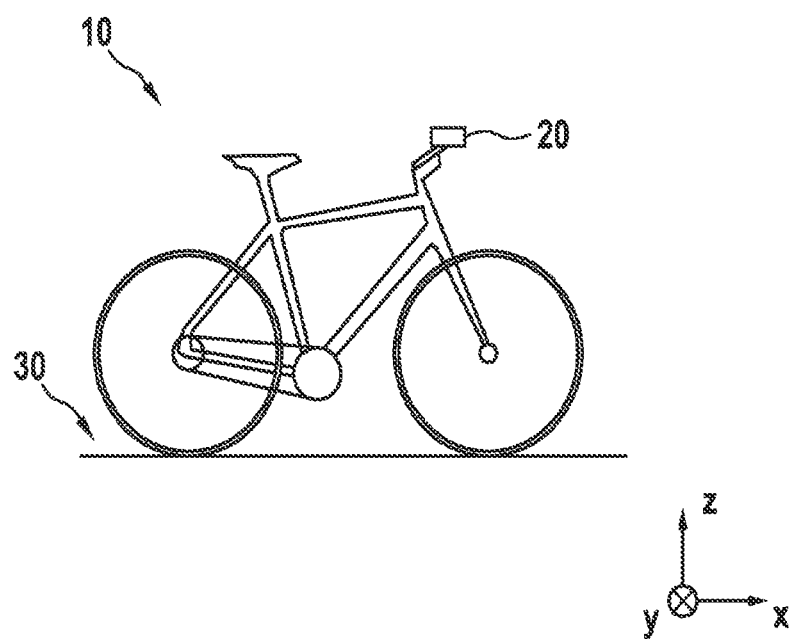
FIG. 1 schematically shows a two-wheeled vehicle having a mobile user terminal and a coordinate system in which the two-wheeled vehicle moves on the surface while engaging in a normal driving activity.
Figure 2:
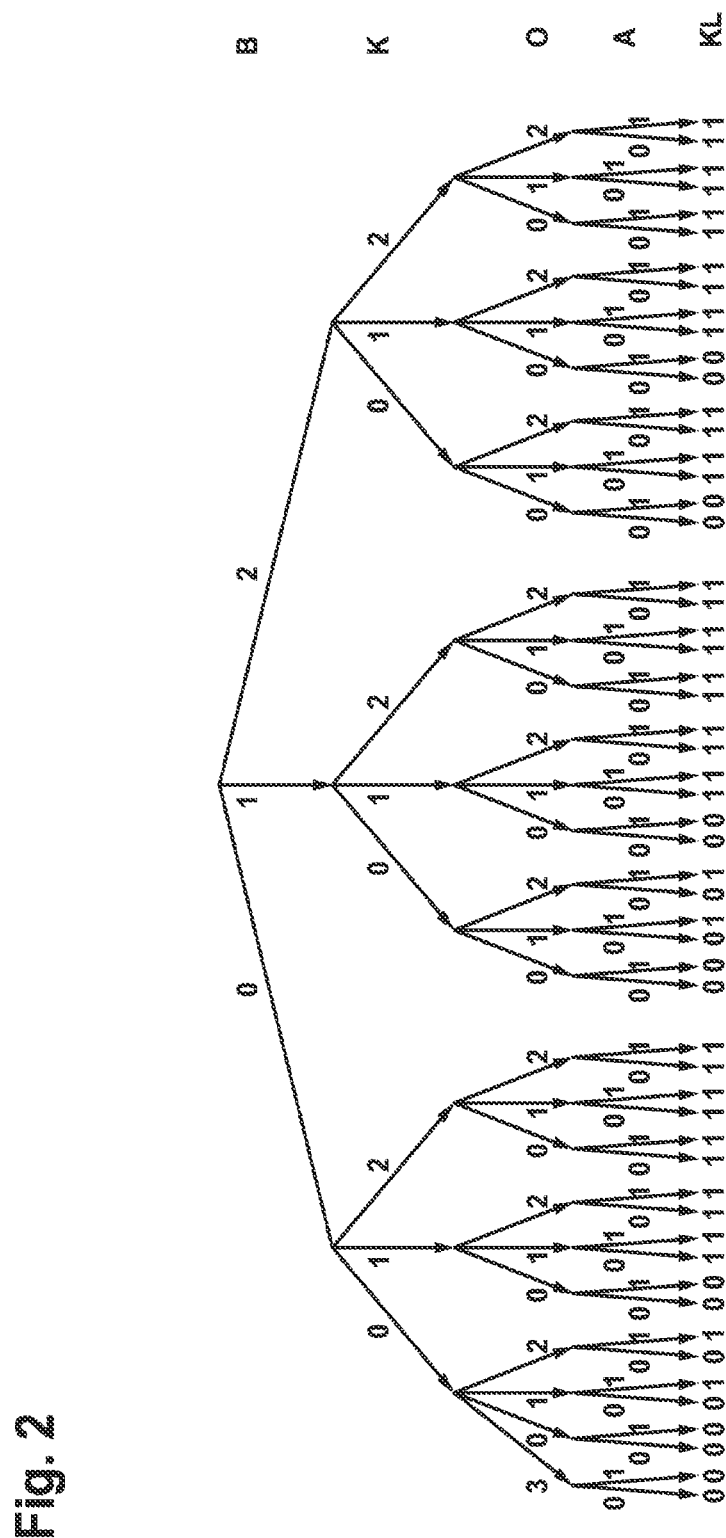
FIG. 2 shows a decision tree by which the classification according to an example embodiment of the present invention is to be illustrated.

The classification according to the present invention acquires multiple sensor variables, state variables and/or operating variables in connection with the operation of the two-wheeled vehicle, based on which a statement about an accident situation can be rendered. For the visual illustration of this classification, FIG. 2 shows an example of a decision tree which shows exemplary variables for a classification. Using a movement variable B, it is first detected whether the two-wheeled vehicle is stationary (=0), is moving slowly, i.e., has a velocity that lies below a threshold value $SW_v$ (=1), or is moving at least at the velocity of threshold value $SW_v$ (=2). In addition, it is determined whether a collision was detected. To this end, the method includes a collision variable K with the aid of which both the lack of a detected collision (=0) can be detected and it can be distinguished whether a light collision (=1) or a serious collision (=2) is present. In this context, for example, it may be specified to detect the value 1 as a collision variable in a detected collision without further information and to detect a 2 as a collision variable only if unambiguously provided information confirms this. In addition, the orientation of the two-wheeled vehicle is acquired based on an orientation variable O. As a matter of principle, it may be distinguished between an upright, i.e., perpendicular, orientation (=0) and an orientation in which the two-wheeled vehicle has moved out of the vertical position (=1, 2 or 3), for instance by lying horizontally on the pavement. Since there are multiple possibilities both for the orientation as such and the movement leading to the changed orientation from the vertical position, it is possible to perform a case-by-case analysis here. For instance, in addition to the orientation of the two-wheeled vehicle, the movement may be acquired as well and taken into account when deriving orientation variable O. For instance, if the two-wheeled vehicle executes a fall over the handlebar, then this accident situation is able to be identified by analyzing the pitch angle θ or its change over time (=1). On the other hand, if the two-wheeled vehicle rolls onto its side, i.e., rotates along longitudinal direction x, then this can be detected via the roll angle φ or its change (=2). It is also possible that the orientation variable is specified as a function of a tilting variable γ, which represents a combined rotation about the longitudinal and transverse axis according to $$\gamma=\sqrt{\theta^2+\varphi^2}$$

Moreover, it may possibly be detected that the two-wheeled vehicle fell down without a rider sitting on the two-wheeled vehicle (=3). This case will normally occur only in connection with an accident or, in general, an operating situation in which no collision has been detected. With the aid of impact variable A, a situation is detected in which the two-wheeled vehicle strikes the ground, the pavement or some other object with sufficient force (=1). For example, this may be detected by acquiring the movement of the falling or tilting two-wheeled vehicle 10. Spring-back of the two-wheeled vehicle when making contact with the ground at a velocity component in the z-direction or in the direction opposite to the fall may indicate an impact, for instance. In addition, the further movement of the two-wheeled vehicle can be taken into account for detecting an impact. If no impact is detected, on the other hand, the orientation variable is correspondingly set to 0. With the aid of such a decision tree, a classification of the accident situation into KL=0, i.e., a harmless accident situation exists or a normal driving situation, and KL=1, i.e., an accident situation is present in which at least measures on the two-wheeled vehicle need to be taken, are able to be distinguished. The assessment according to FIG. 2 should be considered merely an example and can also be chosen differently in the selection of the individual criteria, B, K, O and A for deriving classification variable KL. In addition, it is also possible to acquire and evaluate the classification variable as a database or vector of the classification criteria.

Figure 3:
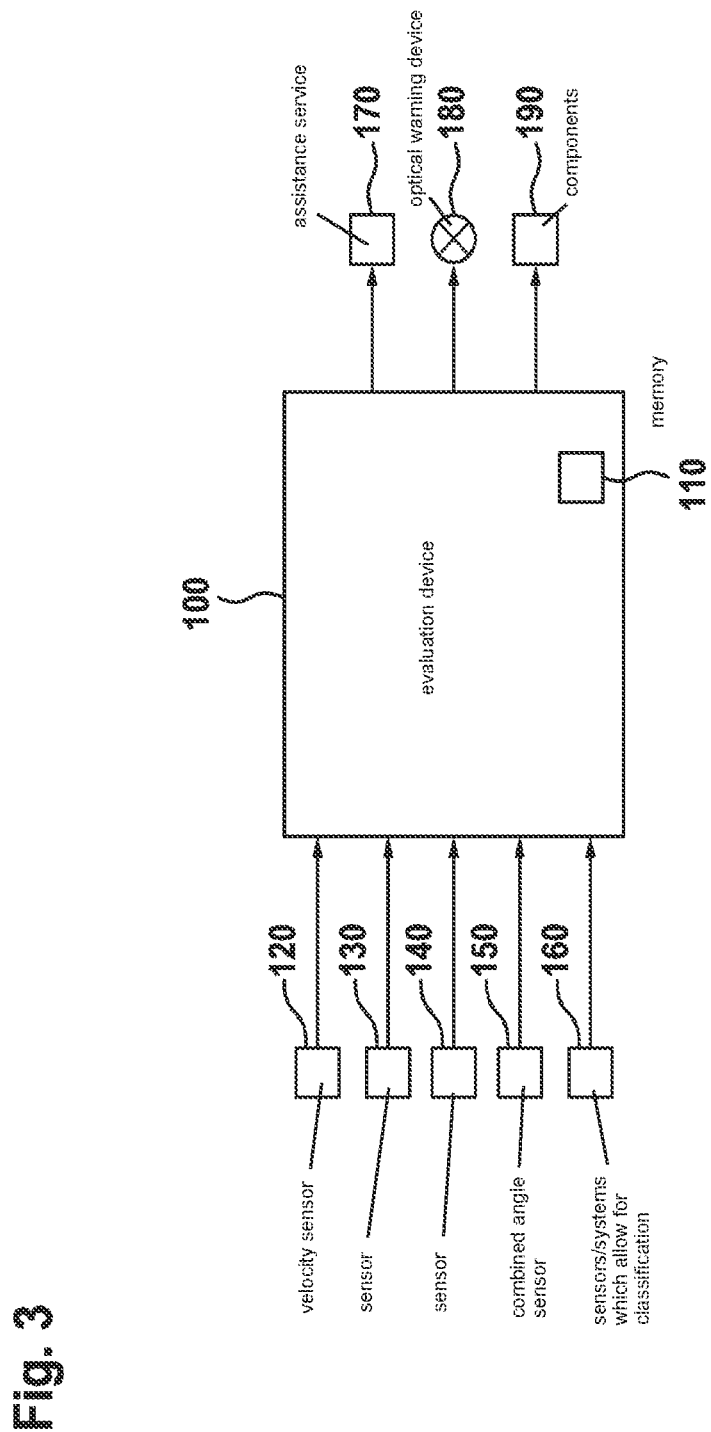
FIG. 3 shows a block circuit diagram of one possible realization of a device according to the present invention.

The classification is able to be carried out in a device with the aid of a method according to the present invention. For this purpose, an evaluation device 100 is provided in the device, which carries out the method according to the present invention (see FIG. 3). In an advantageous manner, evaluation unit 100 includes a memory 110 in which threshold values, limit values, a database or other information for carrying out the classification is/are stored. Memory 110 is furthermore able to be used for buffer-storing sensor variables and for acquiring, deriving or generating at least one movement variables O, collision variable K, orientation variable O, and/or impact variable A. Evaluation unit 100 is designed to acquire the sensor variables and/or the information of different systems in order to derive a classification variable KL therefrom. For example, a velocity sensor 120 may supply velocity sensor variables $v_x$ and $v_y$, which correspond to velocity components of two-wheeled vehicle 10 both in the x- and the y-direction, to evaluation unit 100. However, it is also possible that the velocity components are generated by different velocity sensors in each case. The acquisition of accelerations $a_x$ and $a_y$ in the x and y directions with the aid of at least one acceleration sensor 120 is possible as well. In addition, it is possible to acquire rates of rotation $\omega_x$ about the longitudinal axis and about transverse axis $\omega_y$ with the aid of one or more rotation-rate sensors. It may be particularly advantageous in such a case to additionally acquire the time period in order to calculate the angle of rotation across the time period during which there are changes in the rate of rotation. However, the angle of rotation about longitudinal axis x, i.e., roll angle φ, and also the angle of rotation about the transverse axis, i.e., pitch angle θ, are moreover also acquirable by a separate or a combined angle sensor 150. When determining the angle of rotation, it may also be taken into account, for example, that after a rotation the two-wheeled vehicle no longer moves beyond a specified period of time. Still further sensors or systems 160 may optionally be provided, which allow for a classification and/or plausibilization of the classification of an accident situation. System 160 may include a camera, an ultrasonic sensor and/or a microphone, for example.

As soon as the classification has been performed and an accident situation been detected that requires an intervention, e.g., an assistance measure, evaluation unit 100 is able to output an emergency call. This emergency call may be directed to an assistance service 170 so that assistance is automatically summoned once a severe accident is detected. However, there may also be classification variables which cause acoustic and/or optical warning devices 180 of two-wheeled vehicle 10 to be actuated as an alternative or in in addition. Both the driver and third parties are thereby able to be made aware of the special accident situation, for instance by being warned of the danger or the driver being informed of a fall of the parked two-wheeled vehicle. In addition, evaluation unit 100 is also able to actuate components 190 of the two-wheeled vehicle in an effort to prevent further damage. For example, evaluation unit 100 is able to shut off a still operating drive, interrupt the energy supply of the battery, or deliberately activate the brakes.

Figure 4:
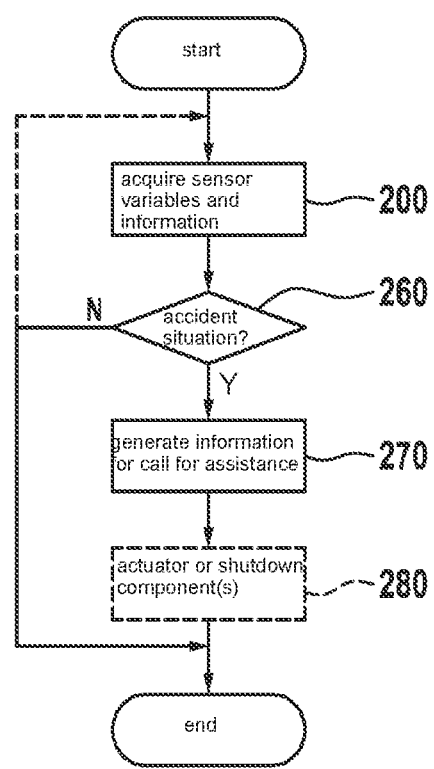
FIG. 4 shows a flow diagram of a first possible exemplary embodiment of a method according to the present invention.

Based on the flow diagram of FIG. 4, a first exemplary embodiment of the method according to the present invention will be be described at the outset. After starting the method or the algorithm, all necessary sensor variables and information required for the classification and the derivation of classification variable KL are acquired or read in in a first step 200, in particular the sensor variables $v_x$, $v_y$, $a_x$, $a_y$, $\omega_x$, $\omega_y$, $\theta$ and $\varphi$. Next, in step 260, it is then detected whether an accident situation exists that requires a report to third parties or the driver (e.g., KL=1). If no such accident situation is present, for instance in that the probability of a personal injury of the driver of the two-wheeled vehicle or a person not involved is low based on variables B=0 (no movement velocity of the two-wheeled vehicle), K=0 (no detected collision) O=0 (two-wheeled vehicle is upright), and A=0 (no impact detected), the method is able to be terminated or be run through again by step 200. On the other hand, if it is detected that an accident situation exists in which the driver or a third person requires assistance, e.g., in a combination of corresponding variables B=2, K=2, O=1 (or γ very high) and A=1, as the basis of the classification, corresponding information for a call for assistance is generated in next step 270. This call for assistance is then able to be output via a wireless connection, possibly together with additional information about the accident situation. It may optionally be provided that at least one component of the two-wheeled vehicle is actuated or shut down in a subsequent step 280, for instance in order to warn the driver or third parties or to prevent further injury by the component after a severe accident. The method may then be terminated.

In a further embodiment of the present invention, sensor variables $v_x$, $v_y$, $a_x$, $a_y$, $\omega_x$, $\omega_y$, $\theta$ and $\varphi$ may also be acquired and made available independently of the classification. To this end, all necessary sensor variables are able to be acquired in a step 300 of a method and stored in memory 110, for example. If necessary, this may be followed by a further step 310 which conditions the sensor variables, for instance by calculating tilting variable γ. The separate acquisition and conditioning of the sensor variables continuously provides the classification with current variables and values. Step 200 would therefore be omitted in the first exemplary embodiment according to FIG. 4.

Figure 5:
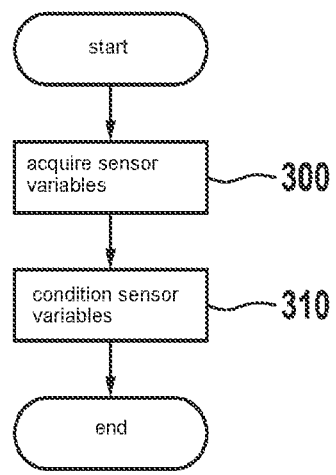
FIG. 5 shows a flow diagram of a separate method which allows the required sensor variables to be acquired independently of the classification process.
Figure 6:
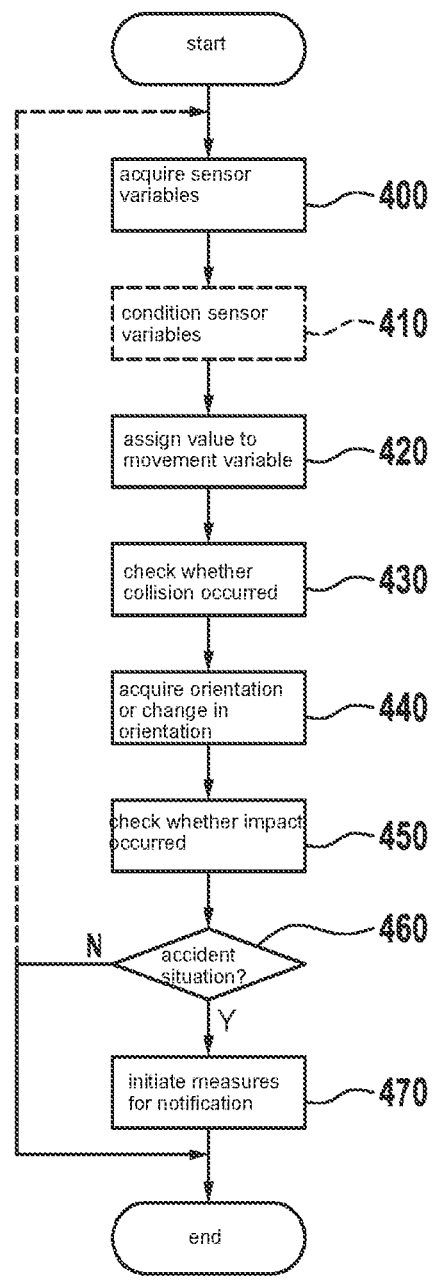
FIG. 6 shows a flow diagram of a second example embodiment of a method according to the present invention.

A second exemplary embodiment of the method according to the present invention will be described based on the flow diagram of FIG. 6. Similar to the first exemplary embodiment, the method or the algorithm is able to be started in response to a detected accident situation, a collision or independently thereof at regular intervals. After the start, the sensor variables required for the present method are acquired in a step 400 and conditioned in an optional step 410. However, these steps 400 and 410 may optionally also be omitted in that the method according to FIG. 5 acquires the corresponding sensor variables and values independently thereof and makes them available to the method according to FIG. 6.

In following step 420, it is checked whether a movement of the two-wheeled vehicle has occurred and a corresponding value is assigned to movement variable B. For example, the movement variable may be assigned a 0 if the two-wheeled vehicle does not move, i.e., is stationary. However, if the two-wheeled vehicle moves below a limit velocity that corresponds to a threshold value $SW_v$, then a 1 may be assigned to movement variable B. If the two-wheeled vehicle reaches at least limit velocity $SW_v$, then a 2 is assigned to movement variable B.

By next step 430 it is checked whether a collision has occurred. Depending on which starting condition exists for the method, this information may already be given by the initiation of the method. Thus, if the system detects that a collision has occurred, e.g., in that further sensor variables are acquired or a further system allocated to the two-wheeled vehicle generates information about a collision, a 1 will be assigned to collision variable K. If it is detected in the process that a serious collision has occurred, then it is also possible to assign a 2 to collision variable K. If no collision is present, collision variable has a 0.

Next step 440 acquires the orientation of the two-wheeled vehicle or the change in orientation. For instance, orientation variable O is assigned a 0 if it is detected that the two-wheeled vehicle is standing upright. In contrast, a 3 is assigned to orientation variable O if the two-wheeled vehicle lies or has essentially left the upright position. For example, it may be provided that a two-wheeled vehicle leaning against a wall is also detected if the bicycle exhibits sufficient tilting from the vertical axis. In this case a continued (upright) ride with the two-wheeled vehicle would not be possible. As further additional or optional distinctions, it may be provided to detect a pitch movement of the two-wheeled vehicle so that the orientation variable O is set to 1 given a sufficiently large pitch angle that may point to an accident or collision. Accordingly, a 2 is assigned to orientation variable O given a sufficiently large roll angle that points to an accident, a collision or parking of the two-wheeled vehicle or the two-wheeled vehicle being placed on the ground. Alternatively, when assigning orientation variable O, the consideration of a tilting variable γ, which detects both a pitch movement and a roll movement, may also be provided. At a tilting variable of γ≥50°, for instance, a fallen two-wheeled vehicle may be inferred. When evaluating the corresponding sensor variables for the acquisition of orientation variable O, it may be provided to consider both the dynamics of the rotary motion and its final position. To this end, the orientation of the two-wheeled vehicle may be assigned only when the two-wheeled vehicle no longer moves for a predefined period of time, that is, no angle change has occurred for the specific period of time.

In the following step 450 it is detected whether an impact has occurred based on the acquired sensor variables or further information. If an impact is present based on the available sensor variables or information, then the value 1 is assigned to impact variable A, while the value 0 will be assigned in the other case.

Depending on movement variable B, collision variable K, orientation variable O and impact variable A acquired or specified in this way, it is detected in next step 460 whether an accident situation that requires a report exists. This report, for example, may involve the reporting of an accident including requested assistance. To this end, a decision may be assigned to each combination of the specified variables B, K, O and A, for instance in conformance with a decision tree of FIG. 2, according to which a notification is transmitted (=1) or the transmission is omitted (=0). It may alternatively also be provided to define additional decisions (=2, 3 . . . ), which are connected with further notifications or measures. For example, it is possible to define a decision 2 for at least one combination of variables B, K, O and A, which may not constitute a notification in the sense of an emergency or assistance call but generates information addressed to a predefinable person, e.g., for information purposes. For instance, the driver could be informed that a parked two-wheeled vehicle has fallen down (e.g., B=0, K=0, O=2, A=1). If it is detected on the basis of acquired variables B, K, O and A that no notification of the driver or third parties is necessary, then the method may be terminated or run through again by step 400 or 420.

After detecting that a notification is to be transmitted, corresponding measures are initiated in step 470. These measures may consist of activating a further system on the two-wheeled vehicle or in a mobile terminal carried along by the driver, e.g., in order to place an emergency call via radio. However, it may also be provided that the device on which the method according to the present invention is running has a device of its own, which may be used to reach an emergency dispatcher or, in general, to output an emergency call. In such a case it is helpful if still further information about the accident situation or the collision is transmitted in order to provide the rescue personnel with sufficient advance information. Optionally, it may also be provided that two-wheeled vehicle components are actuated in step 470 because of the detected accident situation or collision in order to protect the driver or further persons or to make them aware of the accident. It would be possible, for instance, that based on a decision event "3" in step 460, it is detected that there is actually no need to output an emergency call, but that the engine and/or the battery of an electrically operated two-wheeled vehicle must be deactivated for safety reasons.

In further exemplary embodiments, it may be provided that the steps 420 to 450 are set up in a different sequence or are carried out in parallel. It may optionally also be the case that not all of the mentioned variables are specified, e.g., in a case where the method is started only once a collision has been detected. It is furthermore possible to acquire additional variables and to take them into account for the classification. In this context, for example, a harm variable S may be acquired or considered, which represents (bodily) harm to the driver. Additional sensor variables or measured values may be utilized to derive further variables within the framework of the decision tree or to plausibilize the specification of individual variables B, K, O or A. For instance, the acquisition of the heart rate, the ambient noise with the aid of a microphone, the image-wise acquisition of the driver or the environment with the aid of a camera or the use of further sensors on the two-wheeled vehicle would be possible.

Instead of a unique assignment both of the individual variables B, K, O or A to the corresponding values and/or the decision in steps 270 and 470, it is also possible to use probability values that are stored in database 110, for instance. These probability values may be fixedly predefined or be configured to be variably adaptable. For example, it is possible to have a teachable system available in the evaluation unit or on an external server, which adapts the probabilities of the occurrence of an accident situation or a collision that requires reporting. Via a radio link, which may also be used for the notification, the database is thereby able to be adapted or expanded based on the experience of a multitude of two-wheel vehicle uses.

Steps 420 through 450, individually or completely, may also be developed in the form of decisions. All results that lead to no report being generated in step 470 may cause the present method to be aborted or to be run through again by the acquisition of the sensor variables.

It may furthermore be the case that not all sensor variables available for the decision in steps 260 or 460 are available at the same time. For example, it is possible that some sensor variables are available only after a partially predefined or definable time period has elapsed. This may be achieved in that it is additionally checked whether the acquired sensor variables in steps 420 to 450 are sufficient for assigning variables B, K, O or A or whether the available movements in step 260 or 460 are sufficient for the decision. If this is not the case, then the method may be run through again by the acquisition of the corresponding sensor variables. As an alternative, the respective assignment or the decision may also be stopped until the corresponding movement has ended or meaningful sensor variables are available. As previously mentioned in connection with the method according to FIG. 5, the corresponding sensor variables may also be continuously generated in parallel so that the method is able to utilize current sensor variables, measured values and results in steps 420 through 450.

What is claimed is:

1. A method for classifying an accident event of a two-wheeled vehicle, the method comprising the following steps:
   acquiring a movement variable which represents movement of the two-wheeled vehicle;
   acquiring a collision variable which represents a collision of the two-wheeled vehicle with an obstacle;
   acquiring an orientation variable which represents an orientation and/or a change in orientation of the two-wheeled vehicle, in a longitudinal or movement direction of the two-wheeled vehicle; and
   acquiring an impact variable which represents an impact of the two-wheeled vehicle on the pavement; and
   generating a classification variable as a function of the movement variable, the collision variable, the orientation variable, and the impact variable, wherein the classification variable represents information about a severity of the accident, and the method further comprises:
   generating information able to be used for rescue purposes as a function of the classification variable when a severe accident exists; and
   outputting an emergency call when a severe accident is detected.

2. The method as recited in claim 1, wherein the two-wheeled vehicle is a bicycle.

3. The method as recited in claim 1, further comprising:
   acquiring as the movement variable, a velocity variable and/or an acceleration variable, which represents the movement of the two-wheeled vehicle or of a part of the two-wheeled vehicle, the movement variable representing the movement, at least separately in a longitudinal direction and a transverse direction.

4. The method as recited in claim 1, wherein acquiring the collision variable includes detecting a collision of the two-wheeled vehicle with an object and/or a person located on a driving plane of the two-wheeled vehicle, the collision being detected as a function of a change over time in a velocity and/or acceleration of the two-wheeled vehicle in at least one direction in space.

5. The method as recited in claim 1, wherein acquiring the orientation variable includes acquiring a roll movement about a longitudinal axis, and/or a pitch movement of the two-wheeled vehicle about a transverse axis.

6. The method as recited in claim 5, wherein acquiring the orientation variable include acquiring a roll angle and/or a pitch angle of the two-wheeled vehicle.

7. The method as recited in claim 6, wherein a tilting variable γ is generated as the orientation variable as a function of the acquired roll angle (φ) and the acquired pitch angle (θ) according to $$\gamma=\sqrt{\theta^2+\varphi^2}.$$

8. The method as recited in claim 1, wherein the acquiring of the impact variable includes acquiring a change over time in velocity and/or acceleration in at least one movement direction of the two-wheeled vehicle, including acquiring a time characteristic of the change in the velocity and/or the acceleration in the direction of the transverse axis of the two-wheeled vehicle.

9. A method for classifying an accident event of a two-wheeled vehicle, the method comprising the following steps:
acquiring a movement variable which represents movement of the two-wheeled vehicle;
acquiring a collision variable which represents a collision of the two-wheeled vehicle with an obstacle;
acquiring an orientation variable which represents an orientation and/or a change in orientation of the two-wheeled vehicle, in a longitudinal or movement direction of the two-wheeled vehicle; and
acquiring an impact variable which represents an impact of the two-wheeled vehicle on the pavement; and
generating a classification variable as a function of the movement variable, the collision variable, the orientation variable, and the impact variable, the method further comprising
actuating a component of the two-wheeled vehicle as a function of the classification variable, the component being an acoustic and/or optical warning device; or
shutting down a component that is in operation including a drive unit.

10. A method for classifying an accident event of a two-wheeled vehicle, the method comprising the following steps:
acquiring a movement variable which represents movement of the two-wheeled vehicle;
acquiring a collision variable which represents a collision of the two-wheeled vehicle with an obstacle;
acquiring an orientation variable which represents an orientation and/or a change in orientation of the two-wheeled vehicle, in a longitudinal or movement direction of the two-wheeled vehicle; and
acquiring an impact variable which represents an impact of the two-wheeled vehicle on the pavement; and
generating a classification variable as a function of the movement variable, the collision variable, the orientation variable, and the impact variable, wherein the classification variable includes information about an accident situation in which no driver was riding on the two-wheeled vehicle, and the method further comprises:
transmitting information to a driver or a specified third party as a function of the classification variable when an accident has occurred without a driver riding the two-wheeled vehicle.

11. A method for classifying an accident event of a two-wheeled vehicle, the method comprising the following steps:
acquiring a movement variable which represents movement of the two-wheeled vehicle;
acquiring a collision variable which represents a collision of the two-wheeled vehicle with an obstacle;
acquiring an orientation variable which represents an orientation and/or a change in orientation of the two-wheeled vehicle, in a longitudinal or movement direction of the two-wheeled vehicle; and
acquiring an impact variable which represents an impact of the two-wheeled vehicle on the pavement; and
generating a classification variable as a function of the movement variable, the collision variable, the orientation variable, and the impact variable, wherein acquiring the orientation variable includes acquiring a roll movement about a longitudinal axis, and/or a pitch movement of the two-wheeled vehicle about a transverse axis, wherein acquiring the orientation variable include acquiring a roll angle and/or a pitch angle of the two-wheeled vehicle, wherein the classification variable includes information about an accident situation in which no driver was riding on the two-wheeled vehicle, and the method further comprises:
transmitting information to a driver or a specified third party as a function of the classification variable when an accident has occurred without a driver riding the two-wheeled vehicle; and
wherein the classification variable, which includes the information about an accident situation in which no driver was riding on the two-wheeled vehicle, is generated at least as a function of a time characteristic of the acquired roll movement and/or a change over time in the roll angle, and
wherein given a strictly monotonic or uniformly steady characteristic of the time characteristic of the acquired roll movement and/or the change over time of the roll angle, the method detects that no driver was riding the two-wheeled vehicle during the accident situation.

12. A device configured to classify an accident event of a two-wheeled vehicle, comprising:
an evaluation unit configured to:
acquire a movement variable, which represents a movement of the two-wheeled vehicle, a collision variable, which represents a collision of the two-wheeled vehicle with an obstacle, an orientation variable, which represents an orientation and/or a change in orientation of the two-wheeled vehicle in a longitudinal or movement direction of the two-wheeled vehicle, and an impact variable, which represents an impact of the two-wheeled vehicle on pavement; and
generate a classification variable as a function of the movement variable, the collision variable, the orientation variable, and the impact variable, wherein the evaluation unit is configured to emit an emergency call as a function of the classification variable when a severe accident exists.

13. The device as recited in claim 12, wherein the two-wheeled vehicle is a bicycle.

14. A device configured to classify an accident event of a two-wheeled vehicle, comprising:
an evaluation unit configured to:
acquire a movement variable, which represents a movement of the two-wheeled vehicle, a collision variable, which represents a collision of the two-wheeled vehicle with an obstacle, an orientation variable, which represents an orientation and/or a change in orientation of the two-wheeled vehicle in a longitudinal or movement direction of the two-wheeled vehicle, and an impact variable, which represents an impact of the two-wheeled vehicle on pavement; and
generate a classification variable as a function of the movement variable, the collision variable, the orientation variable, and the impact variable, wherein the evaluation unit is configured to:

actuate, as a function of the classification variable, a component of the two-wheeled vehicle, in particular an acoustic and/or optical warning device, or shuts down, as a function of the classification variable, a component that is in operation, the component including a drive unit.

15. A two-wheeled vehicle, comprising:
a device configured to classify an accident event of a two-wheeled vehicle, including:
an evaluation unit configured to:
acquire a movement variable, which represents a movement of the two-wheeled vehicle, a collision variable, which represents a collision of the two-wheeled vehicle with an obstacle, an orientation variable, which represents an orientation and/or a change in orientation of the two-wheeled vehicle in a longitudinal or movement direction of the two-wheeled vehicle, and an impact variable, which represents an impact of the two-wheeled vehicle on pavement; and
generate a classification variable as a function of the movement variable, the collision variable, the orientation variable, and the impact variable.

* * * * *